(12) United States Patent
Tušer et al.

(10) Patent No.: US 11,991,960 B2
(45) Date of Patent: May 28, 2024

(54) IRRIGATION BAG AND BAG ASSEMBLY FOR IRRIGATION OF PRIMARILY FULLY-GROWN, MATURE AND VETERAN TREES AND METHOD OF TREE IRRIGATION

(71) Applicants: Martin Tušer, Roztoky (CZ); Žaneta Tušerová, Roztoky (CZ)

(72) Inventors: Martin Tušer, Roztoky (CZ); Žaneta Tušerová, Roztoky (CZ)

(*) Notice: Subject to any disclaimer, the term of this patent is extended or adjusted under 35 U.S.C. 154(b) by 0 days.

(21) Appl. No.: 17/257,120

(22) PCT Filed: Nov. 18, 2019

(86) PCT No.: PCT/CZ2019/000056
§ 371 (c)(1),
(2) Date: Dec. 30, 2020

(87) PCT Pub. No.: WO2021/027980
PCT Pub. Date: Feb. 18, 2021

(65) Prior Publication Data
US 2021/0400890 A1    Dec. 30, 2021

(30) Foreign Application Priority Data

Oct. 3, 2019    (CZ) .................. CZ2019-615

(51) Int. Cl.
*A01G 25/02*    (2006.01)
*A01G 29/00*    (2006.01)

(52) U.S. Cl.
CPC ............. *A01G 25/02* (2013.01); *A01G 29/00* (2013.01)

(58) Field of Classification Search
CPC ....... A01G 25/02; A01G 29/00; A01G 27/006
See application file for complete search history.

(56) References Cited

U.S. PATENT DOCUMENTS 4,087,938 A    5/1978    Koch
5,117,582 A *  6/1992    Cissel, Jr .............. A01G 23/04
                                                          47/21.1
(Continued)

FOREIGN PATENT DOCUMENTS

DE    285783 C      7/1915
FR    2543794 A1   10/1984
(Continued)

OTHER PUBLICATIONS

Notification of Transmittal of the Internationalsearch Report and the Written Opinion of the International Searching Authority, or the Declaration dated May 28, 2020 for App. No. PCT/CZ2019/000056.

*Primary Examiner* — Richard G Davis
(74) *Attorney, Agent, or Firm* — Daniel J. Honz; Advent, LLP

(57) ABSTRACT

Irrigation bag for irrigation of primarily fully-grown, mature and collection trees, which contains at least one non-pressurized filling opening (3) and/or at least one filling opening (4) with pressure filling fitting, and it also contains in the lower part simple openings (21) for discharging liquid and/or waterproof seams and/or dripper (22) and/or connecting piece (23) with dripping hose connection (24), and the volume of the bag is up to 4000 litres. Irrigation bag assembly, where at least one bag (1) contains at least one non-pressurized filling opening (3) and/or at least one filling opening (4) with pressure filling fitting, and the bags (1) are connected via a connecting hose (51) connected with openings (4) and/or connected with connecting elements (5). Tree irrigation method using bags or bag assembly where the bag (1) or bag assembly (1) is placed as close to the tree canopy dripline (103) at least partly on permeable subsoil (104).

19 Claims, 5 Drawing Sheets

(56) References Cited

U.S. PATENT DOCUMENTS

| | | | | |
|---|---|---|---|---|
| 6,023,883 A | * | 2/2000 | Bacon, Jr. | ............. A01G 25/02 47/48.5 |
| 2002/0148158 A1 | * | 10/2002 | Anderson | ............. A01G 25/02 47/40.5 |
| 2006/0064929 A1 | * | 3/2006 | Allen | .................. A01G 29/00 47/48.5 |
| 2011/0308152 A1 | * | 12/2011 | Harley | ................. A01G 25/00 47/48.5 |
| 2014/0366438 A1 | * | 12/2014 | Lancaster | ........... A01G 27/006 47/48.5 |
| 2019/0278304 A1 | | 9/2019 | Grossman | |

FOREIGN PATENT DOCUMENTS

| | | | |
|---|---|---|---|
| FR | 2576177 A1 | | 7/1986 |
| KR | 20110005884 U | * | 6/2011 |
| KR | 20110005884 U | | 6/2011 |

\* cited by examiner

Fig. 5a
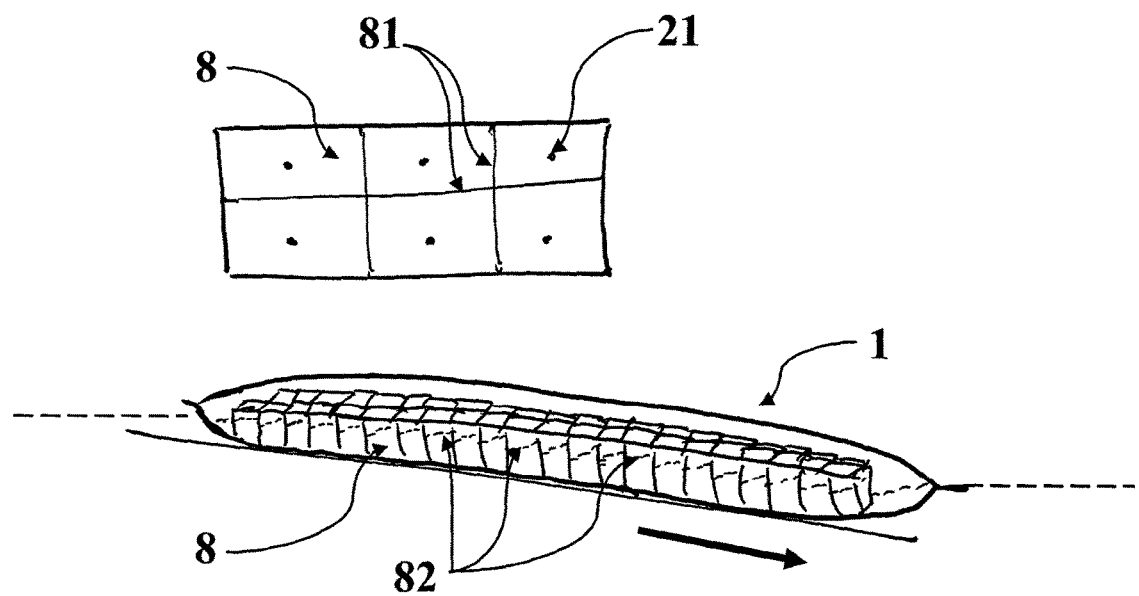
Fig. 5b
Fig. 6a
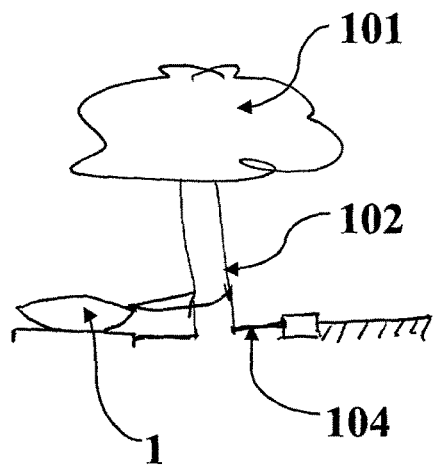
Fig. 6b
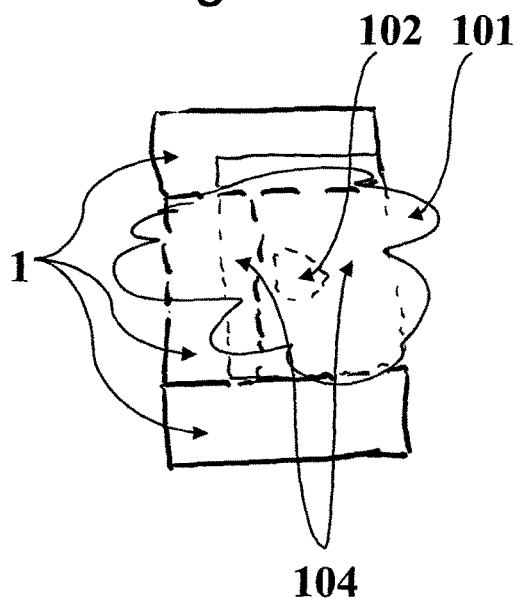

IRRIGATION BAG AND BAG ASSEMBLY FOR IRRIGATION OF PRIMARILY FULLY-GROWN, MATURE AND VETERAN TREES AND METHOD OF TREE IRRIGATION

TECHNICAL FIELD

The invention relates to an irrigation bag intended in particular for irrigation of fully-grown, mature and veteran trees. It provides a drip or micro irrigation solution for trees usually over 5 years old in a manner independent of a permanent water supply that effectively deals with deep water penetration over a large area of the root system and increases the chances of tree survival and further prosperity in adverse climatic conditions. The invention relates to an assembly of these bags and to an irrigation method by means of the device according to the invention.

BACKGROUND ART

Each tree that is planted at a particular site adapts to local conditions during growth. This process is slow, which corresponds to the nature of the weather fluctuations in the past centuries and millennia, to which the trees have adapted.

Today we are at a time when the climate, especially in human settlements, is changing very quickly and the speed of the process of adapting to local conditions does not correspond to the real needs of trees. Trees are thus exposed to various stress factors, especially drought and heat stress. Trees that have been growing often for centuries and have an estimated value of millions wither and cease to prosper after several years and dry. This causes irreparable economic, social and environmental damage. It is in times of climate change that every tree is needed for human survival. Resolving tree mortality by new planting is not effective because a fully-grown tree would have to be replaced by hundreds of newly planted trees. Their leaf area and thus their cooling function is much lower than that of fully-grown trees. In addition, the planting and rooting of new trees in human settlements is now problematic.

Irrigation of newly planted trees is now resolved using stationary drop irrigation, usually using a drip hose connected to a permanent source of water, irrigation bags or, least efficiently, irrigation using a hose. For older and veteran trees, however, there is no effective solution yet, as it is necessary to supply at least 1000 to 4000 litres to trees at a time, in depth and at the same time over a large area, and that is why they are usually not watered.

For irrigation of trees older than 5 years, it is possible to use irrigation bags designed for newly planted trees. Two pieces are joined together, usually holding about 190 litres of water. The pair are placed beyond the tree canopy level (canopy dripline). It is necessary to use at least 5 pairs, i.e. 10 bags. However, 20 pairs are needed to achieve an ideal watering capacity of 4000 litres, which represents 40 filling openings.

However, this solution is not ideal and encounters very difficult and lengthy filling, as many filling openings mean time loss, vulnerability, removal by wind or the risk of theft. Such a solution also does not prevent any person from damaging the tree by pouring foreign pollutants into the bag through the unprotected filling opening. Such a solution is also not ideal because the shapes and materials of existing bags for newly planted trees do not allow for repair in the event of damage to the bag by vandals or animals (piercing, burns, cuts, bites by rodents seeking water, etc.). Generally, the materials from which the existing bags are made cannot be glued, and if so, the hydrostatic pressure exerted by the water is very high and limits the durability of the joint. The shape of these bags is complex, the material bends in small radii (high stress on the material) and the bags are tall, usually 50-65 cm, which increases the water pressure on the material and thus also the joint. The folds and the high pressure do not allow the bag to be securely sealed.

It is essential for society that trees, especially in settlements, prosper and do not dry out. In this way, they will fulfil their cooling function and the society will maintain great values for the future. This saves on the costs of planting new trees. The principle of preserving older trees is simple: irrigation the right way. However, implementation in practice is not as simple.

At present, irrigation bags are known, but they are placed in an inappropriate way directly to the tree trunk.

During growth, the root system of trees extends not only deeply, but also laterally. The nature of root growth depends on three factors. In particular, it is the species (taxon) of the tree, the nature of the subsoil, e.g. the tree hits a rock at a shallow depth, and also the distribution of water at the place where the tree grows. If, for example, the ground water is 0.5 m below the surface, the roots spread more to the sides.

Gradually, the roots at the trunk become stabilizing roots, which ensure the firm anchoring of the tree in the subsoil and thus its, e.g., resistance to wind. Their function of absorbing nutrients and water disappears. This function is taken up by roots that grow farther from the tree trunk. The general rule is that the roots important for water absorption, the so-called feeder roots, are located behind the so-called tree canopy dripline.

If the existing irrigation bags are placed not to the trunk, but beyond the canopy dripline, there is a significant disadvantage, as each bag needs to be refilled separately and requires a constant presence. Usually the filling time of bags for one full-grown tree is around an hour and a half and requires the constant presence of the filling worker.

Irrigating fully-grown trees to the trunk is nonsensical, ineffective, or at least extremely ineffective, and there is a risk of fungal root diseases, which are among the most common causes of the necessary felling of older trees in the urban environment—if the roots are attacked by a fungal disease, such as brittle cinder, honey fungus, etc., this means irreversible processes whose only solution is felling the tree.

An example of a poor way of watering an older tree, in this case irrigation bags according to the existing state of technology, is influenced by the inappropriate concept of bags, because if the bags were placed at the right distance beyond the tree canopy, their manager has a fully justified fear of easy removal of the bags, which are lightweight and in no way protected. There is a risk of the bags being blown away very easily on roads in the neighbourhood, which is not safe.

The solution according to the invention effectively removes this problem and can also be electronically guarded with regard to its value.

SUMMARY OF THE INVENTION

The basis of the invention is an irrigation bag intended especially for irrigation of fully-grown, mature and veteran trees. The solution is variable—it can be used effectively on any tree usually older than 5 years.

The bag allows the tree to survive on climatically extreme days and allows it to recharge energy in periods of normal weather.

We have developed several other possible technical solutions. All of them make it possible to efficiently supply adequate quantities of water to sufficient depth under reasonable economic and time conditions.

The invention provides variant technical solutions comprising the following features:

Bag Filling Method

The filling of the bag is ensured by means of at least one of two elements which may be present in the design independently or in combination with each other. In both cases it is a filling opening. In the first variant there is a filling opening for non-pressure filling, and in the second variant it is a filling opening with an overpressure filling valve combined with a pressure relief valve, which ensures air discharge. In the case of non-pressurized filling, the bag is usually filled with water by means of a water line hose or gravity or by means of a pump from another water collection element such as an IBC container or tank.

For pressure filling, the bag is equipped with a fitting for attaching a pressure, e.g. firefighting hose, and includes a pressure relief valve to reduce pressure. This is a proven solution. A disadvantage is the relatively high cost of such a solution, which is, however, compensated later by minimizing service costs when filling the bag, as it significantly saves operator time and allows for a much larger number of bags to be filled in a given time interval.

In the case of bag sets which are interconnected, it is sufficient if at least one of these bag contains the filling opening, or the filling opening of the remaining bags may be used to connect the bags. Thus, the bag may contain at least one filling opening and/or at least one connecting opening for connection with other bags. Details of the connection openings are provided below in the text.

In the variant design, the non-pressurized filling opening is preferably provided with a filling trunk or a cylinder perpendicular to the longitudinal axis of the bag, preferably 15 cm in diameter. The trunk may be equipped with a clip for closing the filling trunk, which includes rings through which the clip can be locked with a padlock.

Emergency Discharge Method

In the variant design, the bag is equipped with a closable opening for emergency emptying of the bag, which is placed on the bottom section or at the bottom of the bag near the edge, similar to swimming pools. This element is used for emergency draining of water from the bag, especially in cases where, for example, water contamination is detected or if it is necessary to quickly remove the bag for another reason. However, this is not an essential element. Its disadvantage is that it increases the risk of mechanical damage to the bag due to stress, abrasion, sustained storage pressure and deliberate discharge by vandals.

Product Shape

The bag according to this invention may have any shape to accommodate the required amount of water. In view of conventional manufacturing processes and achieving low costs, it is desirable that the shape be as simple as possible. It must also meet the requirements for strength, ease of handling and, above all, it must be suitable for the purpose described, which is to supply the tree with the necessary water where it has roots through which it draws water, i.e. in the area outside the tree crown.

Thus, the filled bag may be cylindrical or the like, and it is preferable that a substantial portion of the bag equipped with liquid distribution openings is in contact with the ground. In the variant design, it may consist of two parts connected to each other, reminiscent of the shape of a cushion, possibly creating a weld at the edges suitable for receiving fasteners such as anchor lugs and others.

The bag ideally has the shape in ground plan of a part of an annulus or a C-shape or part of the letter C, wherein the longitudinal axis of the bag extends through the center of the annulus and partially or completely copies the shape of a circle with a diameter of 3.5 to 25 m, preferably 7 m, and in the cross-section, when filled with water, the bag has an oval or flattened oval shape, possibly with sharp side peaks if it consists of two parts, and the ratio of bag height to bag width varies depending on the amount of water that the bag is filled with, or the bag has a D-shape with a solid base in the cross-section.

This preferred bag size is determined as usual for fully-grown trees, and the circle size with the center passing through the center of the tree trunk may range from about 3.5 m to about 25 m, depending on the habitus of the relevant tree. Examples are poplar on one side and plane tree on the other. For practical reasons, the length of the bag should not exceed 6 m, but it is not limited by this invention. The width of the bag in the discharged state is usually about 0.5 m. The preferred dimensions are given below in the description.

In the case of using multiple bags, which is assumed with respect to the usual canopy perimeter of fully-grown trees, the shape of the bag is predetermined by its size, i.e. the larger the bag, the more its shape should copy the relevant canopy perimeter of the tree, as only in this way is it possible to effectively cover the area where the roots of the tree to receive moisture are present. Part of the reason is also aesthetic.

It is advantageous for the relevant bag assembly to occupy at least ⅔ of the total perimeter of the tree canopy.

If the bag is used in urban areas, e.g. for trees planted on sidewalks or parking lots, i.e. with significantly limited space for bag placement, the bag assembly or bag itself may in one variant be approximately in the shape of a U or C, which is otherwise an acceptable variation from the above-described shape to copy the shape of the tree canopy, as the tree roots are very often hidden beneath a paved walkable surface, such as a sidewalk, and the only place to receive moisture is around the tree trunk, i.e. the space for receiving moisture is much smaller than the size of the tree canopy and is usually square or circle-shaped.

For the variant with an approximate U-shape, it is preferred that there is one U-shaped bag with a base and shoulders length of approximately 2 m and a bag width of 1 m. In another variant, the bag assembly is made up of three bags of approximately 2 m in length and 1 m in width, connected to each other at an angle of 90° by means of interconnecting elements and possibly also connecting elements, which are described below. It is preferred that there is access to the tree from at least one part, and it is therefore not preferable to surround the entire trunk with the bag. A bag or bag assembly of approximately C-shape meets similar requirements.

In another variant design of the shape, the bag is formed by a body whose walls have the same composition as accordion bellows, i.e. it can be arbitrarily turned sideways and create a specific curvature as needed. Such a bag may be straight, and depending on its length, we can also create a circular bag configuration, including variants of bags designed in particular for urban trees resembling the letter C or U. The walls of such a bag contain ribs, which may be formed of rigid or flexible plastic. The disadvantage of such a bag is the complexity of production and thus the resulting price, but such a bag is easily storable.

Water Release Method

The bottom of the bag contains a number of plain openings for liquid distribution that are in contact with the ground. Preferably, these plain openings have a diameter of about 1 mm and thus serve to slowly release water from the bag. These openings are not susceptible to clogging, but in contact with an impermeable or completely smooth surface, the necessary water release may not occur. This disadvantage can be overlooked since the center of gravity of the used bag lies in its use on grassy or paved, i.e., slightly wrinkled, surfaces.

The bag has 3 to 6 openings with a diameter of 0.5 to 1.5 mm per 1 m2, ideally 4 to 5 openings with a diameter of 1 mm per m2 of the surface of the bag that is in contact with the ground.

Alternatively, or in combination with plain openings, the bag contains at least one dripper. For commercially produced drippers of all types, the flow capacity of a particular dripper in litres per hour is always known. Therefore, it is advisable to calculate the number of drippers according to their capacity depending on the target time for the bag to completely flow out. For even water distribution over a large area of the root system, it is preferable to use more drippers with a lower capacity (optimally 10 drippers with a capacity of 3 litres per hour per m2) than fewer drippers with a higher capacity (e.g. 5 drippers with a capacity of 6 litres per hour).

However, in order to alleviate this drawback, the following modifications are proposed in which the opening is constructed in the same way as droplet irrigation hoses, in which a flat dropper covered with plastic film is welded in the material at the bottom of the bag, which prevents impurities from the outside of the bag from penetrating through the opening, especially when dragging the bags on the ground as expected during standard handling. The disadvantage of this solution, however, is the poor accessibility for cleaning if the opening is blocked by deposits from above. For this purpose, the dripper can be placed in the thread in order to allow it to be removed, cleaned and reinserted. However, this variant may present disadvantages in the form of mechanical thread damage. The thread is then welded to the bottom of the bag and is made of a material that is not at risk of tearing or other damage. For the proper functioning of the bag and to minimize the risks associated with the use of this element, it is appropriate if the bag contains a combination of plain openings and openings containing a dripper.

In the variant opening design, it is possible to achieve the release of water through seams if the bag contains them, especially if it is composed of multiple parts joined by seams. These seams are then not fully tightened and therefore allow water to pass through. The disadvantage of this solution is the clogging of openings.

Alternatively, a plastic film which is not fabric-reinforced can be used, especially if an optimum plastic material is found which does not present a significant disadvantage for this purpose.

Another method of releasing water from the bag is by using mass-produced drippers, i.e. emitters, which can be deposited anywhere around the perimeter of the bag and/or at the bottom of the bag, and in some cases in the bottom area of bag that is in contact with the ground. Examples include the following types of drippers or other elements for releasing water from a bag:

- tightly welded emitter, which can also be placed on the flat bottom of the bag on the surface. This means that the tree is then irrigated from multiple points. These emitters are able to release water even on a completely smooth surface. Their disadvantage is their vulnerability; this is a weak point of the product when towing a heavy bag on the ground during handling;
- variable attachable dripper that can be placed anywhere around the bag. The dripper is applied in such a way that the wall of the bag is punctured, and the emitter is installed. The disadvantage of this solution is the possibility of placing the drippers only around the perimeter of the bag and weakening the material and reducing the durability of the bag;
- method of attaching a bag to a drip hose which uses a connector to connect the drip hose to a spike that pierces the bag and the closure closes the opening and directs the water flow to the drip hose, which can be spread to the desired irrigation location. This solution is very variable as it allows to adapt to many specific situations on the spot, to use hoses of different lengths, etc. It is therefore particularly suitable where it is difficult to adapt to the lack of space. It is particularly suitable where there is already a dripping system in the ground around the tree, i.e. there is a necessary irrigation system, but for some reason it is not connected to the water supply system and is dependent on external water supply. Connecting the bags and this existing or newly delivered dripping system, or the dripping hose assembly at the desired location, is therefore very convenient and can be designed for new tree planting.

Material Composition of the Product

In an optimum variant with respect to the price ratio, workability and mechanical properties, the bag is made of PES polyester fabric with the softness of textile fibers in the range of 900 to 1300 decitex, preferably 1100 decitex, which is equipped with a double sided PVC coating. This material exhibits high resistance. Thanks to welding technology, it is possible to create various shapes, it is very tensile and abrasion resistant and is available in the required colours. Its surface is preferably opaque on one side, which reduces the conspicuousness of the final product in the field. In case of damage the material is repairable. This material is also UV resistant. It can be printed with durable colours so that the bag can also be used as a promotional item. At the same time, it is a material that is very resistant to accidental damage, such as being driven over by a car, stepped on, etc. Both the material itself and the weld are completely impermeable to water. This material is also used for military purposes. It is also advantageous to fold the bags when they not in use. The material is light-proof, so there is no risk of algae on the walls of the bags.

In the preferred design, the polyester textile layer is equipped with an aramid fiber reinforcement to provide even greater resistance, particularly against deliberate damage to the bags, or when placed on the ground with sharp objects and objects such as stones, wires, rock gardens, etc.

The following are acceptable materials for making any part of the bag:

- unsoftened plastics produced by injection into a moulding. This method would make it possible to produce very impressive and design shapes, but it would be impossible to effectively store multiple pieces of such a product.
- unsoftened plastics produced by extrusion and subsequent finalization, which is a typical PVC treatment of a water hose or sewer pipes of large diameter with a plug and drilling holes or fitting of drippers;
- UV stabilized rubber produced by vulcanization into a mould;
- softened PVC/PET/PE etc. are UV stable and theoretically any plastic film can be used which is supplied in the form of an endless tunnel, which is closed at the ends and again equipped with one of the water release possibilities according to this invention. The advantage of using this type of material would certainly be the much lower price, but durability is very low. It is only suitable for use in extreme temperatures to overcome the short period of time when it is necessary to secure trees that otherwise do not suffer from lack of moisture, or for economic reasons where funds for a more permanent measures are lacking;

leather skins, as tanned leather that is impregnated is waterproof. By stitching them together and equipping them with one of the ways of releasing water, the same effect can be achieved as with plastic films. The advantage of this material lies in the level of design and the choice of renewable material. This material is particularly suitable for special purposes, e.g. for memorial trees or anywhere where the use of plastic is inappropriate, whether for aesthetic, cultural or other reasons.

Bag Stabilization

The optimal solution to stabilize the bags against unwanted movement, especially on slopes and uneven surfaces, which also secondarily prevents empty bags from being carried away by wind or theft of bags, is the use of straps attached to the ground using fasteners such as pins, rods, anchors, ground screws, etc.

In the preferred design, the distribution of the stabilizing straps is such that they are spaced at intervals of 0.5 to 1.5 m and the width of the strap is 3 to 7 cm, preferably 5 cm.

Another possibility is to use fasteners in the form of anchors or loops placed on the edge of the bag, either welded metal loops as on a building tarpaulin, or loops that are flatly sewn into the weld at the edges of the bag. The bag is connected to the ground by means of a connecting element that passes through the anchor eye and/or loop. Preferably, the connecting elements are located on the inner and outer circumferential walls of the bag, in particular on the weld of the two parts of which the bag optionally consists.

The ideal spacing of these connecting elements is at a spacing of approx. 40 to 80 cm, preferably 60 cm, around the entire perimeter of the bag, since it is necessary to provide a sufficient anchoring surface of the pins relative to the bag volume, adequate stress on the weld material, i.e. distribution of tension and pressure. We must also consider the different slope orientations relative to the tree trunk. For this reason, it is desirable that the connecting elements, i.e. eyelets and/or loops, are located on both the outer and inner sides of the bag or on the shorter sides.

Ensuring Protection Against Vandalism or Theft

As mentioned above, the basic protection is the stabilization of the bag, which prevents easy theft. Furthermore, it is necessary to consider the use of resistant material against vandalism, which is reflected in the price of the product. A layer of aramid fibers, which is subsequently equipped with a PVC coating, can be applied to the polyester fabric or other suitable material. The disadvantage of this solution is only the price and difficulty of material processing.

As suitable protection against tree poisoning, or contamination of the liquid inside the bag, it is advisable to equip all easily accessible openings with a locking element. In particular, the filling opening should be secured with a lock. Of course, this solution cannot protect the bag against any intentional damage. Indeed, a tree can be poisoned regardless of the presence of the bag itself. The lock can only serve as the first barrier.

Another possible form of protection against vandalism is to equip the bag with a shock sensor, which triggers an acoustic signal when someone starts tampering with the bag. The shock sensor can be placed, for example, in the lock of filling opening.

Due to the high purchase price of the bag and its location in a public space, there is a risk of damage to the investor if the bag is stolen. Protection of the bag against this behaviour can be secured mechanically and by means of a search signalling device, e.g. GPS locator. A very suitable means of proof to prove ownership of a bag is to equip the bag with an RFID chip, which ensures the uniqueness of the bag and can therefore also serve for inventory purposes. In case of theft, it will be easy to trace its owner. The RFID chip can be placed in the wall of a bag, or it can be welded directly into the material from which it is made without its presence being apparent to thieves. Each bag can be equipped in an accessible place with a printed identification element, e.g. an identification code (usually a serial number), which allows for immediate identification of the bag owner based a record of a purchase agreement.

Mechanical protection consists of equipping the bag with connecting elements or articles, e.g. anchored lugs welded into the seam, ideally with an inner opening diameter of at least 15 mm, so that it is possible to pull a chain or a durable steel cable that can be anchored in a lockable way around a tree trunk. It is necessary to choose the appropriate level of security and to dimension these protective elements both with regard to the price of bag and the importance given by the presence of bag at a given tree, but also with regard to local crime conditions.

When a high level of bag security is required, a GPS locator connected to a tracking device can be used to alert the investor, for example by connecting to a central security console, that the bag has left the designated location. Subsequently, this element allows for locating the stolen/moved bag and determine its coordinates.

A suitable technical solution is to enclose the GPS locator with a battery of sufficient capacity in a watertight openable case that can be freely inserted into the bag. Because it is large enough, it can float anywhere in the bag. This GPS locator is protected against its removal from the bag by the variable and adjustable shape configuration of its outer box, which will not allow it to be pulled out through any opening in the bag without knowing the correct shape of the box. In principle, this box acts as a key and the filling opening as a lock.

The GPS locator can be placed in the weld of the bag, similar to the aforementioned RFID chip, but this solution seems to be less advantageous because unlike the RFID chip, the GPS locator needs to be powered, which would be possible mainly through a waterproof membrane, e.g. via a USB port or jack, or wirelessly. Above all, it would be necessary to break the integrity of the bag if the GPS locator is damaged.

Elements for Connecting a Bag to the Assembly

As already mentioned, this solution consists both in making the bag suitable for individual use, which is given by its dimensions for the final need, and it particularly relates to the bag usable in the assembly with other bags. This is in no way limiting the possibility that a bag suitable for self-use cannot be combined with other bags. Each bag, even a bag suitable for self-contained use, is connectable to an assembly with other bags. In accordance with the invention, a bag suitable for independent use is primarily one which, by its dimensions, covers the entire or a substantial area of the root system to be irrigated; i.e. this is usually a bag reaching a large length and volume, usually exceeding 5 m in length, as well as bags intended for placement by trees where there is very little space to distribute water to the roots, and generally these are trees planted on sidewalks and parking lots.

For this purpose, it is necessary to resolve both the interconnection of water distribution, which can be resolved by the presence of filling openings usable for interconnection of individual bags, and/or the bag can be equipped for this purpose with one or more interconnection openings, preferably created in the top part of bag, or even better in the middle of the top wall of the bag. At least one bag must have and filling opening and the remaining bags must contain either and filling opening and/or at least one connecting opening. It is preferred that one bag to be connected to the bag assembly has at least two interconnecting openings or a combination of a filling and connecting opening. Even better, the bag contains more than three connecting openings. The bags are connected to each other via a connecting and/or filling opening with a connecting hose, and any of these openings can be equipped with a branch to feed the liquid flow to other bags.

A single bag in the basic configuration with a prerequisite for connection to bags and particularly suitable for dense urban spaces must be at least 30 cm wide when empty and at least 100 cm long, preferably not more than 120 cm wide when empty and preferably not exceeding 400 cm in length when empty while its length preferably does not exceed 400 cm. The bag may have a square shape in the ground plan. In the preferred design, the bag width when empty is approximately 100 cm and the length is 200 cm, with a useable volume of approximately 400 l.

It applies in the aforementioned examples that the width is given for an emptied bag.

For bags intended for single use, the length is not as limiting, although it usually ranges up to 6 m. On the other hand, for particularly fully-grown trees with a canopy diameter of more than 7 m, it is advisable to use several bulky bags otherwise intended for separate use, as three bags of 5.5 m in length are required to cover ⅔ of the perimeter of the tree with canopy.

In one design variant, where the bag is formed by welding the upper and lower parts, the height of the bag filled with 1000 l of water is about 35 cm, and when filled with 1500 l of water the height is up to 50 cm. The height of the bags at discharge is close to the simple sum of the thicknesses of the two layers of material.

The height of the bag when filled to full capacity is 5 to 100 cm, more preferably 15 to 80 cm, and even better 25 to 65 cm, and most preferably 30 to 50 cm.

The bag is equipped with at least one filling opening and/or connecting opening to connect other bags. The opening is preferably located at the top of the bag in the middle, less preferably at any location in the bag.

As can be seen from the description, the filling opening in the case of a multiple bag assembly may only be created on one bag, while the remaining bags are connected to the bag equipped with a filling opening through connection openings. Preferably, however, the bags are interconnected by filling openings with a branch, thereby saving production costs.

Connecting opening is primarily a hose coupling to which the hose is connected, ideally a pool hose, less preferably any hose or pipe that provides a flexible but at the same time strong and impermeable connection of two bags. From production, the outlets of the hose couplings are provided with blanking plugs, which can be opened or removed. Connecting openings are located ideally on all 4 sides of the bag, ideally at the center of each side, less ideally at any other point on the side of the bag. It is therefore possible to join bags into assemblies of any shape.

A bag assembly may contain as many bags as can be assembled on the target perimeter around the tree canopy, preferably outside the tree canopy dripline. In the case of an adjacent tree line, it is possible to guide the bag assembly from one tree to another and thus create a very long row of successive bags, which is particularly suitable for filling purposes.

As is already apparent from the above description, it is particularly advantageous if the interconnecting opening is formed in the upper part of the bag for filling, since bags placed higher could be emptied through the connection openings and the water would flow into the lower bags. A suitable measure may be the placement of the overflow flap in the connection openings or in the filling openings, depending on the method of filling. It is advisable to fill the lower bags first, from which the higher bags will be filled, while the overflow flap prevents water leakage from the higher bag into the lower bag.

For even distribution of water in sloping terrain, the bag can be equipped with an internal partition or a chamber system. In a situation where a 6 m bag lies on an inclined surface, water collects on only one side of the bag. At a 5% bag slope, the height difference is 30 cm over a 6 m bag length, which is basically one of the possible bag heights as an ideal solution when filled. The result is uneven watering of the tree.

As a technical solution to this situation, a system of chambers has been designed that would eliminate this negative phenomenon by dividing the bags into smaller chambers that are opened at the top, each occupying an ideal size of 10% of the bag area, ranging from 33% to 2% of the bag area, which reach from the bottom of the bag from 30 to 95% of the bag height, preferably up to about 80% of the height of the filled bag. When the bag is filled, the chambers are filled gradually. When the level rises above the upper edge of the chamber, it overflows the bulkhead and begins to fill the adjacent chamber. Gradually, the entire bag is filled to the edge of each bulkhead in this manner. In this way, enough water remains at the point where the water is to be absorbed by the roots and the uniformity of water distribution by the bag in the entire area covered by the bag in sloping terrain is greatly improved.

Bag Monitoring

In order to monitor the water level and temperature and to detect the emptying of the bag for further refilling, it is good to equip the bag with a level sensor with emptying detection, optionally supplemented with a temperature measurement function which can also send water temperature data in addition to reports on water levels. This goal is achieved, for example, by equipping of any of these sensors with a communication interface for connecting the sensor to the IoT via a low-voltage LOWAN network—e.g. LoRaWAN, sigfox, etc.

Emptying detection increases the efficiency of bag usage and its utility value, because if the bag lies unused somewhere, its purchase value is not returned.

Bag Volume

The bag designed according to this invention has a volume of up to 4000 litres, more preferably 600 to 2000 litres, even more preferably 900 to 1200 litres, most preferably 1000 litres. The most advantageous 1000 l variant allows maximum watering efficiency, especially when the bag is filled from the IBC container. Its size is just 1000 l and it is the most common way of filling irrigation devices independent of the constant water supply.

The bag has this volume even in the case of joining into systems, where a range up to 1200 l is preferable. Even more advantageous is the range of 300 to 600 l, when there is sufficient variability of placement in space and sufficient water volume for the tree. We consider the 400 litre bag the best value for the basic bag volume module.

It is not necessary to cover the whole root system area (it is not possible to find out exactly where the roots are for each individual tree), i.e. the circle does not even have to be closed. Watering also does not have to run simultaneously through all bags, as it is possible to use one bag and move it the next day to another place at the end of the canopy of the same tree. It should also be said that such watering does not fully replace the entire water consumption of the tree per day, which sometimes consumes more. This is a support measure that both renews the upward rise of groundwater and simply supplies enough water for the tree to survive during extraordinary times of the year. What is more important is the volume of water, and general usage is 1 to 4 m3 of water per tree. Water in small spaces, typically street alleys, can also be applied repeatedly immediately after the bag has discharged, i.e. repeatedly refill in one place to apply sufficient watering within the confined space. The watering should be done once a month at most. The amount of watering should also be a max of 3 to 4 times a year, as the trees must not get used to it and must gradually adapt to less favourable conditions.

The volume of the bag should be in balance with the capacity of water release from the bag. The water from the bag should drain completely within 4 to 48 hours, preferably within 6 to 24 hours, even more preferably within 6 to 12 hours. The ideal time of bag release is considered to be 8 hours, which is sufficient to allow water to enter the root system without loss, and at the same time the ideal time for efficient use of the bag over shifts. In the morning the bag is filled, it is empty in 8 hours and can either be removed to prevent vandalism or used on another tree. In extreme conditions the bag can be filled up to 3 times per day, which is practically feasible. Thus, irrespective of the water release method used, the release capacity should be provided in relation to time.

The tree irrigation method according to the invention is characterized in that the device according to the invention is installed as close as possible to the tree canopy dripline on a permeable subsoil, preferably along the tree canopy dripline, even more preferably along the outer perimeter of the tree canopy dripline. Alternatively, the device is installed wherever water absorption roots may be expected, unless it is not possible for safety or spatial reasons to utilize the most convenient location along the outer perimeter of the tree canopy dripline. Preferably, the irrigated area occupies at least ⅔ of the length of the perimeter of the tree canopy. The tree is irrigated through this device for 4 to 48 hours, preferably within 6 to 24 hours, even more preferably within 6 to 12 hours. The ideal time of bag release is considered to be 8 hours.

OVERVIEW OF IMAGES IN THE DRAWINGS

FIG. 5a shows the view of the internal chamber of the bag from above;

FIG. 5b shows the axonometric view of the bag containing chambers to achieve a stable level along the length of the bag when the bag is placed on a slope;

FIG. 6a shows the section via the bag assembly distributed along a tree whose canopy extends beyond the permeable subsoil area and whose root system is thus partially located under the impermeable subsoil;

FIG. 6b shows the view from above of the situation according to FIG. 6a, where the bags are spaced in a U-shape and partially cover the permeable subsoil;

EXAMPLE OF EMBODIMENTS

Example 1

Figure 1:
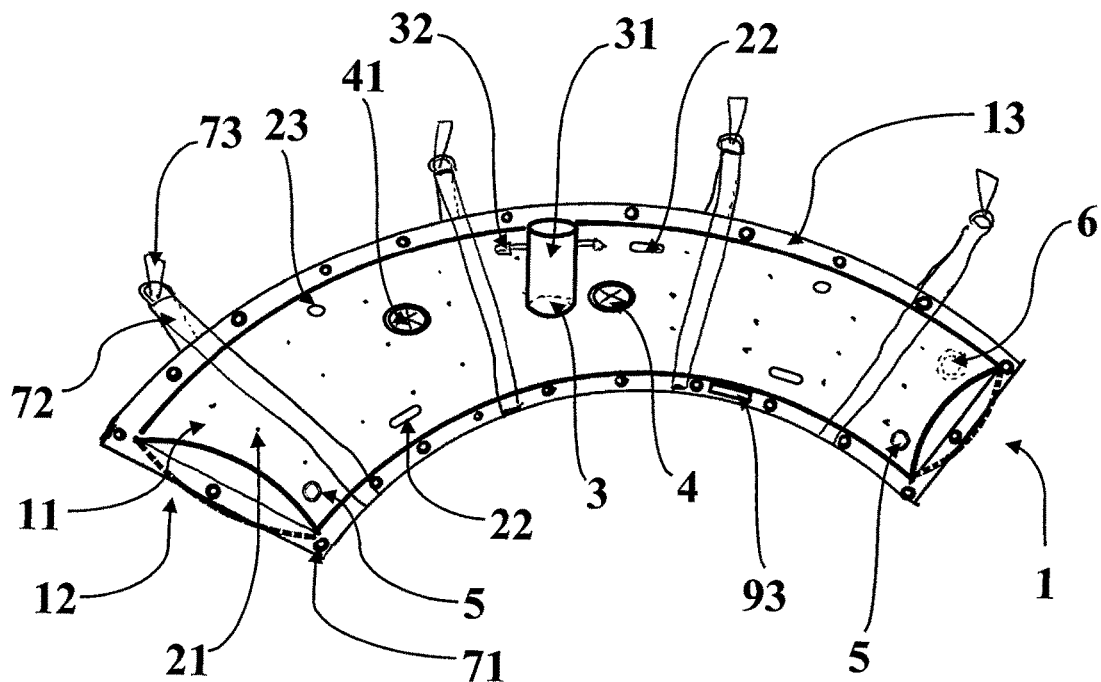
FIG. 1 shows the bag design according to this invention in an axonometric view which contains advantageous elements and a preferred shape that is intended, among other things, for separate use.
Figure 2A:
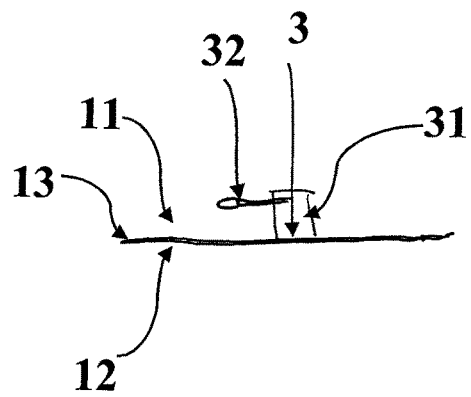
FIG. 2a shows the side view of the emptied bag consisting of two parts, containing a weld and filling opening with a filling trunk with clasp.
Figure 2B:
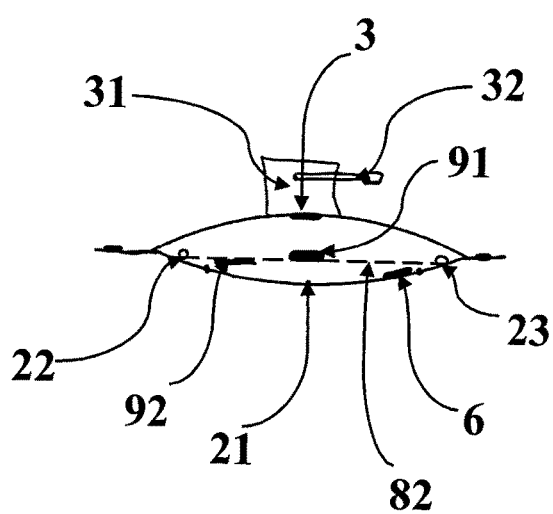
FIG. 2b shows the side view of the partially filled bag consisting of two parts, containing a weld and filling opening with a filling trunk with clasp, and visible are simple openings, dripper, coupling for dripping hose, search signalling device, level and/or temperature sensor and opening for emergency drainage.
Figure 3:
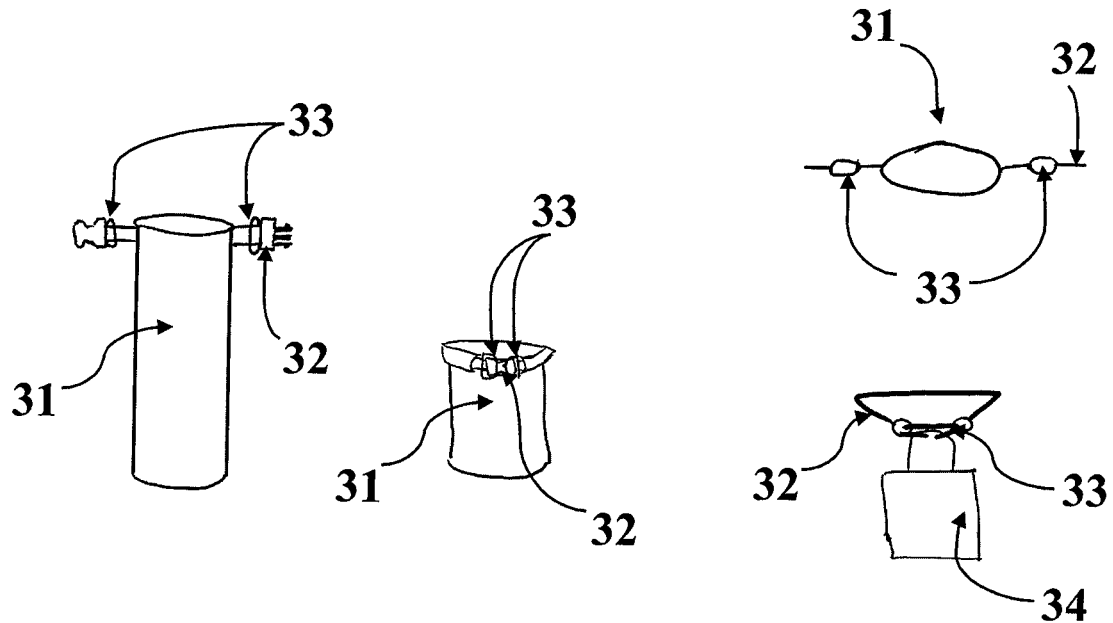
FIG. 3 shows the views from above of the filling trunk and method for closing it with a clasp and provided with a locking element in one view.
Figure 4A:
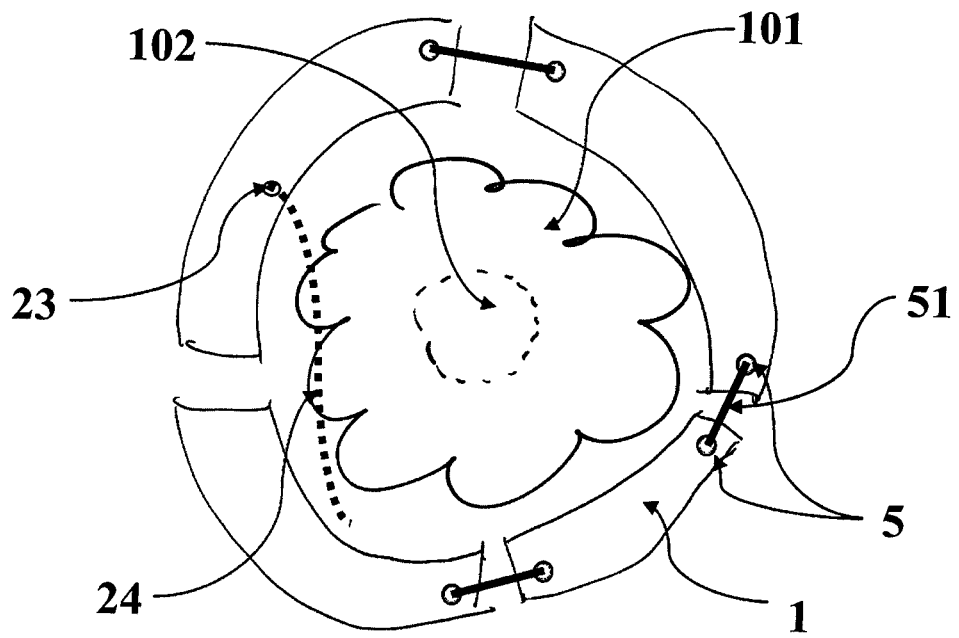
FIG. 4a shows the view of the bag assembly placed along the perimeter of the tree canopy beyond its dripline, connected to each other by a connecting hose and containing a coupling with a dripping hose.
Figure 4B:
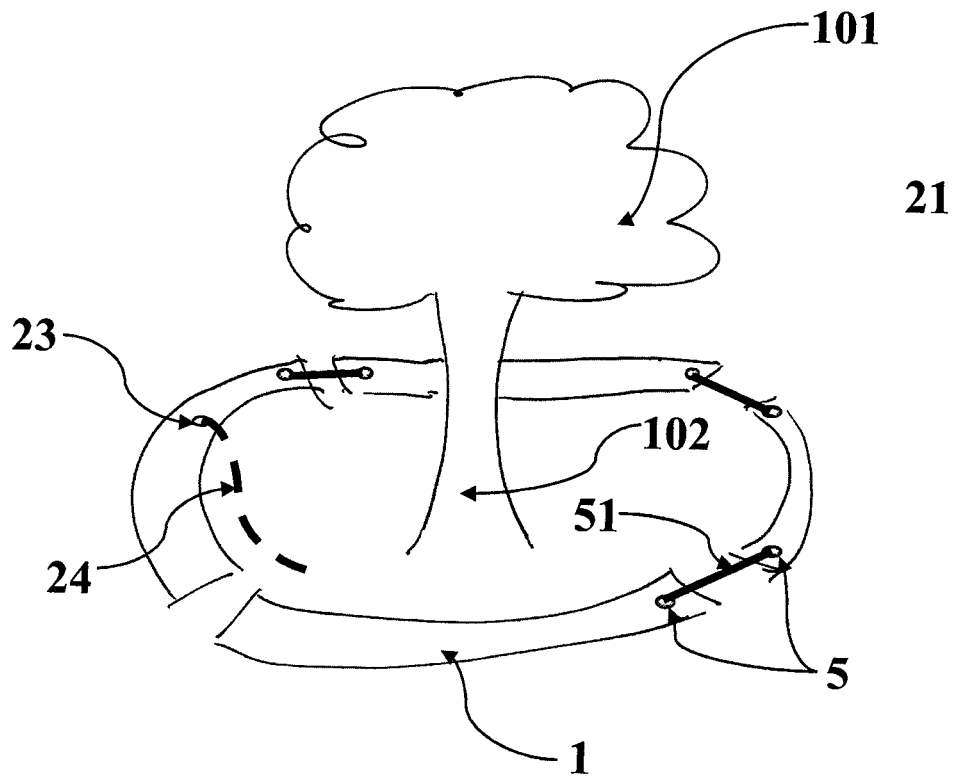
FIG. 4b shows the axonometric view of the bag assembly according to the previous image.
Figure 4C:
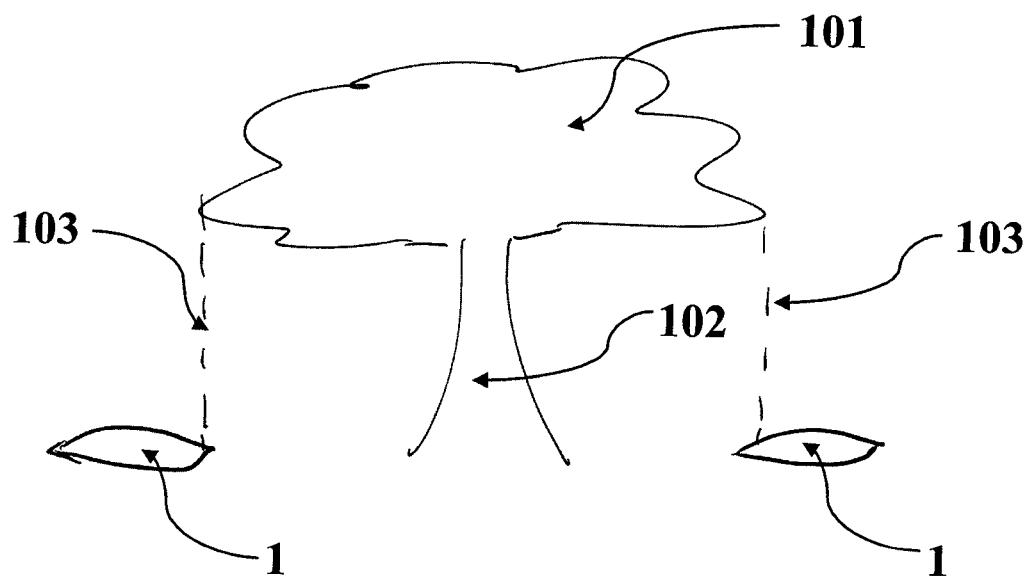
FIG. 4c shows the section via the suitable placement of the bag assembly beyond the tree canopy dripline.
Figure 7:
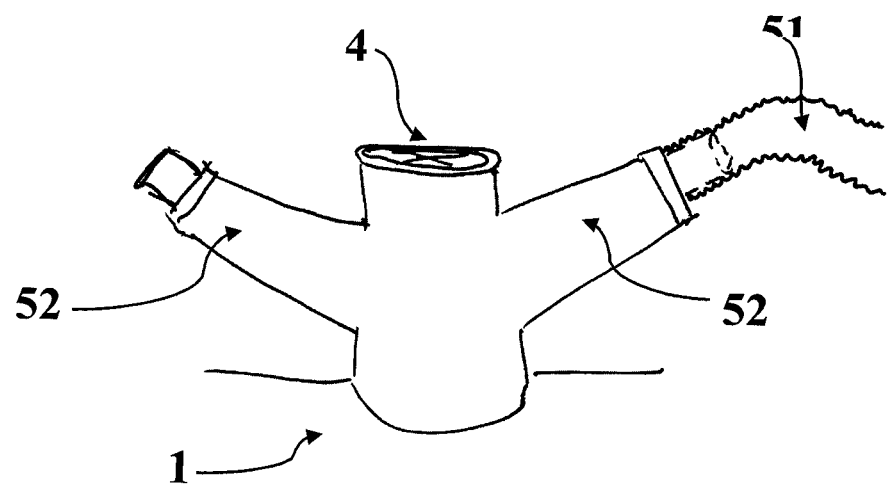
FIG. 7 shows a detailed view of the filling opening with pressure filling fitting equipped with two branches for connection to the interconnecting hose.

Irrigation bag for the irrigation of primarily fully-grown, mature and veteran trees in a variant containing a suitable design that contains non-pressurized filling opening (3) and filling opening (4) with pressure filling fitting, and also contains in the lower section simple openings (21) for liquid release and water permeable seams and drippers (22) and a connecting piece (23) with dripping hose connection (24), and the volume of the bag is 1000 litres. It also contains pressure relief valve (41) for pressure filling. Opening (4) is equipped with a branch (52) for connecting the interconnecting hose (51). It also contains at least two connecting elements (5) to guide the liquid into the next bag (1), which are created in the upper part (11) of the bag in the middle of the upper part (11) of the bag. The interconnecting element (5) is the hose connecting piece. The interconnecting element (5) and filling opening (4) contain an overflow flap to prevent backflow of liquid. The bag contains 5 openings with a diameter of 1 mm per m2 of the bag area, which is in contact with the ground. It contains a total of 10 drippers (22) with a flow capacity of 3 l per hour per 1 m2, selected from the group containing a fixed-welded emitter, variable snap-on dripper designed for placement on the bag circumference and a flat dripper installed at the bottom of the bag, where one flat dripper is covered with plastic foil, the second is threaded and the third is tightly welded into the material of the bag (1). The non-pressurized filling opening (3) is equipped with a filling trunk (31) with a cylindrical shape placed perpendicularly to the longitudinal axis of the bag (1), whose diameter is 15 cm. The filling trunk (31) is equipped with a clasp (32) to close access to the opening (3).

All of the openings (3,4) and the interconnecting element (5) are equipped with a locking element (34). The clasp (32) contains rings (33) for positioning the locking element (34). The irrigation bag consists of two parts connected to each other, wherein one part forms the upper part (11) and the other part forms the lower part (12) and is equipped with a weld (13) at the edge. It is also equipped with an opening (6) for emergency discharge of the bag that is placed on the bottom part or in the bottom (12).

The bag (1) is in the shape of part of an annulus in the ground plan, where the longitudinal axis of the bag (1) passes through the center of this annulus and partially or completely follows the shape of the circle with a diameter of 7 m, and, when filled with water, in the cross-section the bag (1) has the oval shape with sharp side peaks. The walls of the bag (1) are made of PES polyester fabric with a 1100 decitex textile fiber softness, which is equipped with PVC coating on both sides, wherein the polyester textile layer is equipped with aramid fiber reinforcement.

In order to better secure the bag, the bag (1) contains a shock sensor and search signalling device (92) and an identification element. The search signalling device (92) is a GPS locator, which is stored inside the bag (1) into a watertight opening case, which is protected against removal by the variable and adjustable shape of its outer box. The identification element is an RFID chip placed in the wall of the bag (1) containing identification data. The shock sensor is stored in the locking element (34). The bag contains a level and temperature sensor (91) for sensing the liquid level in the bag, which is equipped with a communication interface for connecting the sensor to the Internet of Things through the LOWAN low-voltage network, in particular the LoRaWAN network or sigfox.

For the purpose of even water distribution in sloping terrain it contains divided internal chambers (8), wherein each chamber (8) occupies an area of 10% of the bag area, and wherein the chamber wall (81) extends to approximately 80% of the height of the filled bag (1).

The bag contains stabilizing straps (72) connected to the ground by means of fasteners (73), in particular pins, rods, anchors and ground screws. The stabilizing straps (72) are spaced 1 m apart and the strap width is 5 cm.

The bag also contains connecting elements (71) in the form of anchoring lugs which are located along the edges of the bag (1) on the inner and outer circumferential walls of the bag in the weld (13), the connecting elements (71) being spaced 60 cm apart along the entire circumference of the bag. The connecting element (71) in the form of an anchor eye has an inner diameter opening of at least 15 mm. The height of the bag filled with 1000 litres of water is approximately 35 cm.

Example 2

Irrigation bag according to example 1, with the difference that it is in the shape of the letter C.

Example 3

Irrigation bag according to example 1, with the difference that in the cross-section it is in the shape of the letter D, wherein the bottom part (12) of the bag is formed by a solid base.

Example 4

Irrigation bag according to example 1, with the difference that the walls of the bag (1) have the same structure and shape as accordion bellows.

Example 5

Irrigation bag according to example 1, with the difference that the walls of the bag (1) they are made of impregnated leather.

Example 6

Irrigation bag according to example 1, with the difference that the identification element is a printed identification code.

Example 7

Irrigation bag assembly containing four bags, where one bag (1) contains a non-pressurized filling opening (3) and a filling opening (4) with pressure filling fitting, and the three adjacent bags (1) are connected via the connecting hose (51) connected to the connecting elements (5) and two adjacent bags are connected via the connecting hose through the filling opening (4) and connecting element (5), and the opening (4) is equipped with a branch (52) for connecting the interconnecting hose (51). The volume of all of the bags is approximately 400 l.

Example 8

Irrigation bag assembly that is in the shape of the letter U, consisting of three bags (1) with about an approximate size of 2 m in length and 1 m in width, connected to each other at 90° using interconnecting elements (51) and connecting elements (71).

Example 9

Tree irrigation method using bags or a bag assembly according to the foregoing examples, wherein the bag (1) is stored along the outer perimeter of the tree canopy dripline (103), and the watered area occupies ⅔ of the perimeter of the tree canopy dripline (103) and the tree is watered for approximately 8 hours.

INDUSTRIAL APPLICATION

The invention is industrially applicable in particular in the field of greenery management on public and private land. It is also an important factor in adapting to climate change, especially in cities, and it can also play a decisive role in heritage conservation, in particular heritage greenery conservation.

The invention claimed is:
1. An irrigation bag for the irrigation of mature and veteran trees, comprising:
a bag body having a volume from 300 liters to 4000 liters;
a filling opening for filling the bag body with a liquid, the filling opening including at least one of a non-pressurized filling opening or a filling opening with a pressure filling fitting;
a fluid outlet disposed in a bottom section of the bag body, the fluid outlet including at least one of a plurality of simple openings for liquid release, a plurality of water permeable seams or drippers, or a connection piece with a dripping hose connection; and a plurality of stabilizing straps configured for connection to a ground surface via one or more fasteners.

2. The irrigation bag of claim 1, wherein the fluid outlet includes the plurality of simple openings, and wherein the plurality of simple openings includes three to six openings with a diameter of 0.5 to 1.5 mm per 1 m² of an area of the bag body configured for contact with a ground surface.

3. The irrigation bag of claim 2, wherein the plurality of simple openings includes four to five openings with a diameter of 1 mm per 1 m² of the area of the bag body configured for contact with the ground surface.

4. The irrigation bag of claim 1, wherein the filling opening includes the non-pressurized filling opening, and wherein the non-pressurized filling opening includes a cylindrical filling trunk.

5. The irrigation bag of claim 4, wherein the cylindrical filling trunk includes a clasp to close access to the non-pressurized filling opening, wherein the cylindrical filling trunk has a minimum heigh sufficient to close the non-pressurized filling opening, and wherein the clasp contains rings configured to install a locking element.

6. The irrigation bag of claim 4, wherein the cylindrical filling trunk is positioned on an upper portion of the bag body.

7. The irrigation bag of claim 4, wherein the cylindrical filling trunk is positioned perpendicularly to a longitudinal axis of the bag body.

8. The irrigation bag of claim 4, wherein the cylindrical filling trunk has a diameter of 15 cm.

9. The irrigation bag of claim 1, further including a locking element configured to couple with the fluid outlet.

10. The irrigation bag of claim 1, wherein the bag body is formed from an upper bag part and a lower bag part connected to the upper bag part, and wherein the bag body is formed from a lightproof material.

11. The irrigation bag of claim 1, wherein the bag body has a shape of a part of an annulus, wherein the bag body has a longitudinal axis that extends through a center of the annulus and at least partially copies a circular shape with a diameter of 3.5 to 25 m, and in a cross section when filled with the liquid, has an oval or flattened oval shape, with a ratio of bag height to bag width varying dependent on an amount of the fluid within the bag body.

12. The irrigation bag of claim 1, wherein the bag body has a shape of at least one of a C-shape, a part of C-shape, or a D-shape in cross section, wherein the bag body has a solid base in a lower portion of the bag body in the D-shape cross sectional shape of the bag body.

13. The irrigation bag of claim 1, further comprising a liquid level sensor for sensing the liquid level in the bag body, wherein the liquid level sensor includes at least one of a level sensor or a temperature sensor, and wherein the liquid level sensor includes a communication interface for connecting the liquid level sensor to the Internet of Things.

14. The irrigation bag of claim 1, further comprising a plurality of connecting elements located along an edge of the bag body along the entire circumference of the bag body.

15. The irrigation bag of claim 14, wherein the plurality of connecting elements is located along inner and outer circumferential walls of the bag body.

16. An irrigation bag for the irrigation of mature and veteran trees, comprising:
a bag body having a volume from 300 liters to 4000 liters;
a filling opening for filling the bag body with a liquid, the filling opening including at least one of a non-pressurized filling opening or a filling opening with a pressure filling fitting;
a fluid outlet disposed in a bottom section of the bag body, the fluid outlet including at least one of a plurality of simple openings for liquid release, a plurality of water permeable seams or drippers, or a connection piece with a dripping hose connection; and
at least one of a shock sensor, a search signaling device, or an identification element.

17. The irrigation bag of claim 16, wherein the irrigation bag includes the search signaling device, and wherein the search signaling device includes a global positioning system (GPS) locator.

18. A method for tree irrigation, comprising:
providing an irrigation bag, the irrigation bag including
a bag body having a volume from 300 liters to 4000 liters,
a filling opening for filling the bag body with a liquid, the filling opening including at least one of a non-pressurized filling opening or a filling opening with a pressure filling fitting,
a fluid outlet disposed in a bottom section of the bag body, the fluid outlet including at least one of a plurality of simple openings for liquid release, a plurality of water permeable seams or drippers, or a connection piece with a dripping hose connection, and
a plurality of stabilizing straps configured for connection to a ground surface via one or more fasteners;
placing the irrigation bag in proximity to a border of a canopy dripline of a tree; and
irrigating an irrigation area about the tree via the irrigation bag with the irrigation area having a length occupying at least two-thirds of a length of perimeter of the canopy dripline of the tree.

19. The method of claim 18, wherein the tree is a mature and veteran tree.

* * * * *